US009369536B1

(12) United States Patent
Holtzclaw et al.

(10) Patent No.: US 9,369,536 B1
(45) Date of Patent: Jun. 14, 2016

(54) EVENT-BASED USER BEHAVIOR TIMELINE, PREDICTIONS, AND RECOMMENDATIONS (71) Applicant: Amazon Technologies, Inc., Reno, NV (US)

(72) Inventors: Andrew John Holtzclaw, Seattle, WA (US); Aaron Z Blower, Vashon, WA (US); Chetan Kumar, Issaquah, WA (US); Raghavendra Nyamagoudar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 13/927,011

(22) Filed: Jun. 25, 2013

(51) Int. Cl.
*G06F 15/16* (2006.01)
*H04L 29/06* (2006.01)
*H04L 29/08* (2006.01)

(52) U.S. Cl.
CPC .................................... *H04L 67/22* (2013.01)

(58) Field of Classification Search
CPC ................................................. G06F 17/30283
USPC ........ 709/204, 205, 206; 705/14.23, 35, 7.32, 705/38
See application file for complete search history.

(56) References Cited

U.S. PATENT DOCUMENTS

| | | | |
|---|---|---|---|
| 6,269,343 B1 | 7/2001 | Pallakoff | |
| 7,216,002 B1 | 5/2007 | Anderson | |
| 7,668,747 B2 | 2/2010 | Murphy et al. | |
| 7,672,897 B2 | 3/2010 | Chung et al. | |
| 8,010,418 B1 | 8/2011 | Lee | |
| 8,150,416 B2 | 4/2012 | Ribaudo et al. | |
| 8,301,495 B2 | 10/2012 | Mason | |
| 8,402,387 B1* | 3/2013 | Iversen | G06Q 30/0242 715/789 |
| 8,554,723 B2 | 10/2013 | Spiegel | |
| 8,804,930 B1 | 8/2014 | Brown | |
| 2008/0052169 A1 | 2/2008 | O'Shea et al. | |
| 2008/0235403 A1* | 9/2008 | Krantz et al. | 709/249 |
| 2009/0197582 A1* | 8/2009 | Lewis | H04W 4/02 455/414.2 |
| 2011/0047012 A1 | 2/2011 | Sherman | |
| 2011/0252011 A1* | 10/2011 | Morris et al. | 707/706 |
| 2012/0166452 A1 | 6/2012 | Tseng | |
| 2012/0226540 A1 | 9/2012 | Batalion et al. | |
| 2012/0239466 A1 | 9/2012 | Hu et al. | |
| 2012/0239467 A1 | 9/2012 | Winters et al. | |
| 2012/0239486 A1 | 9/2012 | Hu et al. | |
| 2012/0239494 A1 | 9/2012 | Hu et al. | |
| 2012/0290380 A1 | 11/2012 | Paul et al. | |
| 2012/0316939 A1 | 12/2012 | Moshfeghi | |
| 2013/0159073 A1 | 6/2013 | Shah et al. | |
| 2014/0194208 A1* | 7/2014 | Splaine et al. | 463/42 |

OTHER PUBLICATIONS

"Why We Search: Visualizing and Predicting User Behavior"—Adar et al, UW, Mar. 2007 http://www2007.org/papers/paper520.pdf.*

(Continued)

*Primary Examiner* — Randy Scott
(74) *Attorney, Agent, or Firm* — Lee & Hayes, PLLC (57) ABSTRACT

Techniques for generating a timeline of significant events associated with a user and of user behavior that is contextually relevant to the events are described herein. Also, the techniques include predicting user behavior that has a tendency to occur after an event and for providing item recommendations associated with the predictions. In some implementations, the event that is noted in predicting user behavior may be retrieved from the timeline.

25 Claims, 9 Drawing Sheets

(56) References Cited

OTHER PUBLICATIONS

Office Action for U.S. Appl. No. 13/689,352, mailed on Oct. 6, 2014, Tyson Christopher Trautmann et al., "Targeting Deals Based on Social Connections", 23 pages.

Office Action for U.S. Appl. No. 13/689,352, mailed on Mar. 27, 2014, Tyson Christopher Trautmann, "Targeting Deals Based on Social Connections", 19 pages.

Final Office Action for U.S. Appl. No. 13/689,352, mailed on Apr. 10, 2015, Tyson Christopher Trautmann, "Targeting Deals Based on Social Connections", 17 pages.

* cited by examiner

EVENT-BASED USER BEHAVIOR TIMELINE, PREDICTIONS, AND RECOMMENDATIONS

BACKGROUND

Often, electronic commerce services provide users with browsing and purchase histories, enabling those users to view items (e.g., goods and/or services) that the users have previously browsed and purchased. While the histories may be complete and detailed, they are bereft of context, such as events going on in the users' life which may have led to the browsing or purchase activities.

Also, these services make use of the histories themselves, matching activities and patterns found in the histories with those of other users who then purchased some item or service in order to recommend that item or service to the user(s) associated with the activities or patterns. For example, one user may have browsed a first book and, the next day, bought a second book. The service may utilize the histories to identify users who recently browsed the first book and may recommend the second book to those users. Typically, the services look for activities or patterns that are fairly recent, as activities occurring further in the past, without any additional context or information, may be less indicative of a user's current interests.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for generating a timeline of significant events associated with a user and of user behavior that is contextually relevant to the events are described herein. An electronic commerce service or other type of service may determine the significant events for a given user based on user data for that user. Such user data may include at least one of personal information, social networking activity, wish lists, user communications, pictures, or user behavior data. The user behavior data may in turn include a browsing history, a purchase history, product reviews associated with the user, collaborative shopping or browsing information, or user communications. In some embodiments, the electronic commerce service may determine the significant events based at least in part on levels of activity associated with social networking items or on sentiment analysis of user communications or collaborative shopping or browsing information. Additionally or instead, the electronic commerce service may determine the significant events based at least in part on wish list activity, semantic analysis of social network activity, of user communications, or of user reviews, demographic information, qualitative data associated with user behavior data, or date-based patterns found in the user data. The significant events may be events occurring in the life of the user independently of (but attested to by) the user data, such as a user birthday or the purchase of the user's home.

Upon determining the significant events, the electronic commerce service determines parts of the user data, including user behavior data, which are contextually relevant to the significant events. The contextual relevance of a part of the user data to a significant event may be determined by proximity in time of the part of the user data to the significant event or based on semantic analysis of the part of the user data.

In some embodiments, the electronic commerce service then generates a timeline structure for the user that includes the significant events and, with each significant event, the user data that is contextually relevant to that event. The electronic commerce service may then present the timeline structure, or parts of the timeline structure, to the user in a number of ways. For example, the electronic commerce service may provide a timeline user interface that exposes the timeline to the user. As another example, the electronic commerce service may, through a social network user interface of a social networking service, present parts of the timeline structure that are contextually relevant to events presented on the social network user interface. As yet another example, the electronic commerce service may present a part of the timeline structure in a user interface associated with a current activity of the user, such as browsing an item(s). The current activity may be contextually relevant to an event in the timeline or may be itself an event in the timeline.

In various embodiments, the techniques for generating a timeline of significant events associated with a user and of user behavior further include predicting user behavior that has a tendency to occur after an event and for providing recommendations for items associated with the predictions. An electronic commerce service, such as the electronic commerce service described above, may determine the predictions of user behavior based at least in part on an analysis of user data in view of user behavior prediction criteria. The user data may include personal information, demographic data, or social network data. In some embodiments, the user data may include the above-described timeline structure. The user data may indicate an event, the event being associated with user behavior which has a tendency to occur following the event. For example, purchases of major appliances tend to follow the purchase of a new house, and purchases of school supplies tend to follow the birth of a child. Such user behavior may follow the event closely in time or years in the future. In some embodiments, the user data may include answers to questions posed to a user in order to formulate item recommendations for the user.

The user behavior prediction criteria include one or more identifiers, patterns or models specifying data that is indicative of the event. These criteria may be one set of multiple sets of user behavior prediction criteria applied to the user data, each set associated with predictions of user behavior. In such embodiments, determining the predictions may include determining which user behavior prediction criteria best fit the user data.

The predictions may, in turn, be associated with recommendations for items, and the electronic commerce service may provide the recommendations to the user associated with the user data. The electronic commerce service may provide the recommendations for items through at least one of an email, real-time browsing, a text message, a social networking or microblog post, or a multi-media message.

Figure 1:
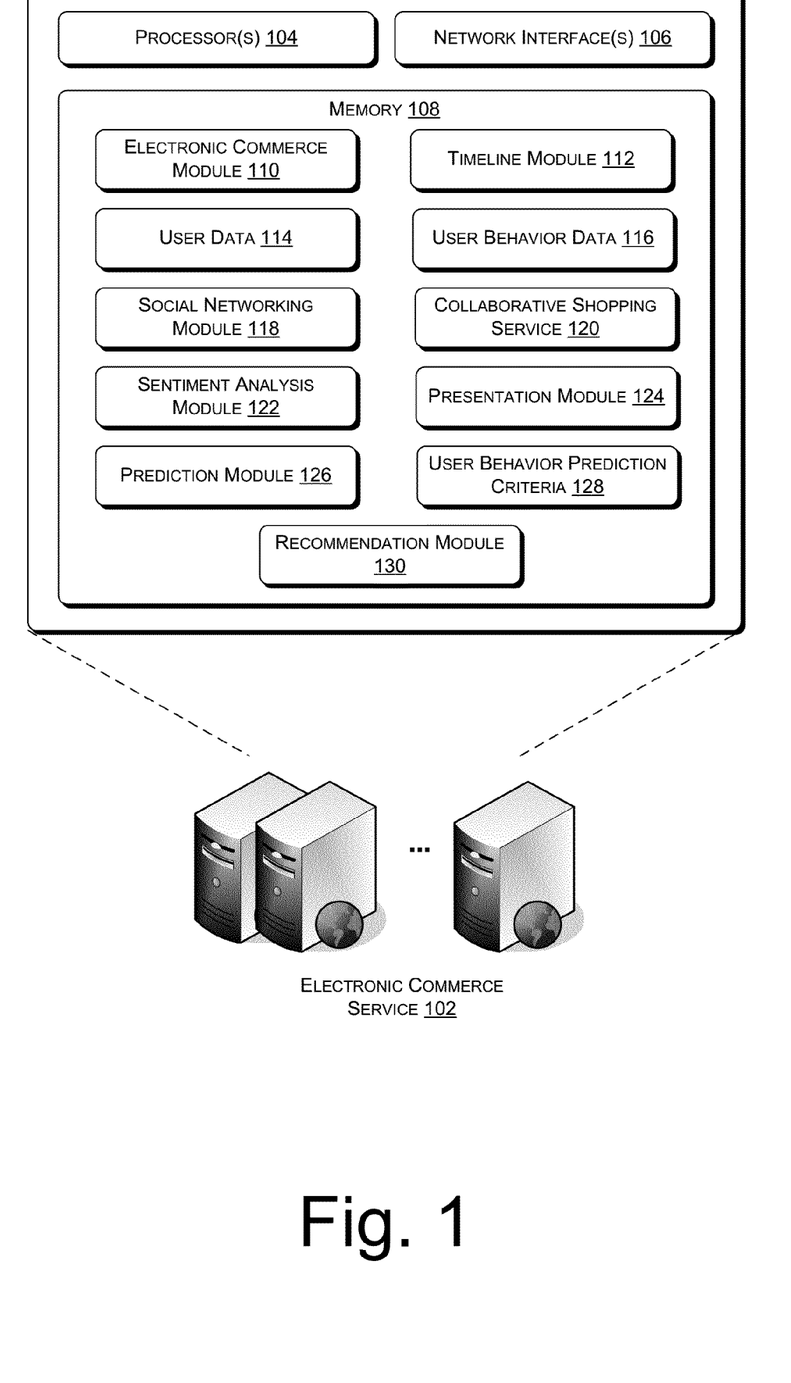
FIG. 1 illustrates example electronic commerce service device(s) configured with functionality for generating a timeline of significant events associated with a user and of user behavior that is contextually relevant to the events, with functionality for generating predictions of user behavior that has a tendency to occur after an event, and with functionality for providing item recommendations associated with the predictions.

FIG. 1 illustrates example electronic commerce service device(s) configured with functionality for generating a timeline of significant events associated with a user and of user behavior that is contextually relevant to the events, with functionality for predicting user behavior that has a tendency to occur after an event, and with functionality for providing item recommendations associated with the predictions. These electronic commerce service device(s) are referred to herein as electronic commerce service 102. The electronic commerce service 102 may be or include a computing device, such as a personal computer (PC), a laptop computer, a server, a server farm(s), a mainframe, a tablet computer, a work station, a telecommunication device, a personal digital assistant (PDA), a media player, a media center device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device. In addition, while FIG. 1 illustrates several example components of the electronic commerce service 102, it is to be appreciated that the electronic commerce service 102 may also include other conventional components, such as an operating system, system busses, input/output components, and the like.

The electronic commerce service 102 may include processor(s) 104, network interface(s) 106, and memory 108. The processor(s) 104 may include any one or more central processing units or graphic processing units. The network interface(s) 106 may support both wired and wireless connections to networks, such as cellular networks, satellite networks, cable networks, radio networks, WiFi networks, short range networks (e.g., Bluetooth, IR, and so forth.). The memory 108 (and other memories described throughout) is an example of non-transitory computer-readable storage media and may include volatile, nonvolatile memory, and/or other persistent and/or auxiliary non transitory computer-readable storage media. Thus, the memory 108 may include, but is not limited to, RAM, ROM, EEPROM, flash memory, or other memory technology, or any other medium which can be used to store content, applications for access by the electronic commerce service 102. In other embodiments, the electronic commerce service 102 may include or utilize a collection of rapidly provisioned and released computing resources hosted in connection with the electronic commerce service 102 or a third party. The computing resources may include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. Such a computing environment may also be referred to as a cloud computing environment.

As illustrated, the memory 108 stores an electronic commerce module 110. The electronic commerce module 110 may be representative of instructions that provide electronic commerce functionalities, such as browsing and purchasing content, and may include a web service. That electronic commerce web service provided by the module 110 may generate and deliver to a user computing device an electronic commerce user interface, such as a landing page of an electronic commerce web site.

Figure 2:
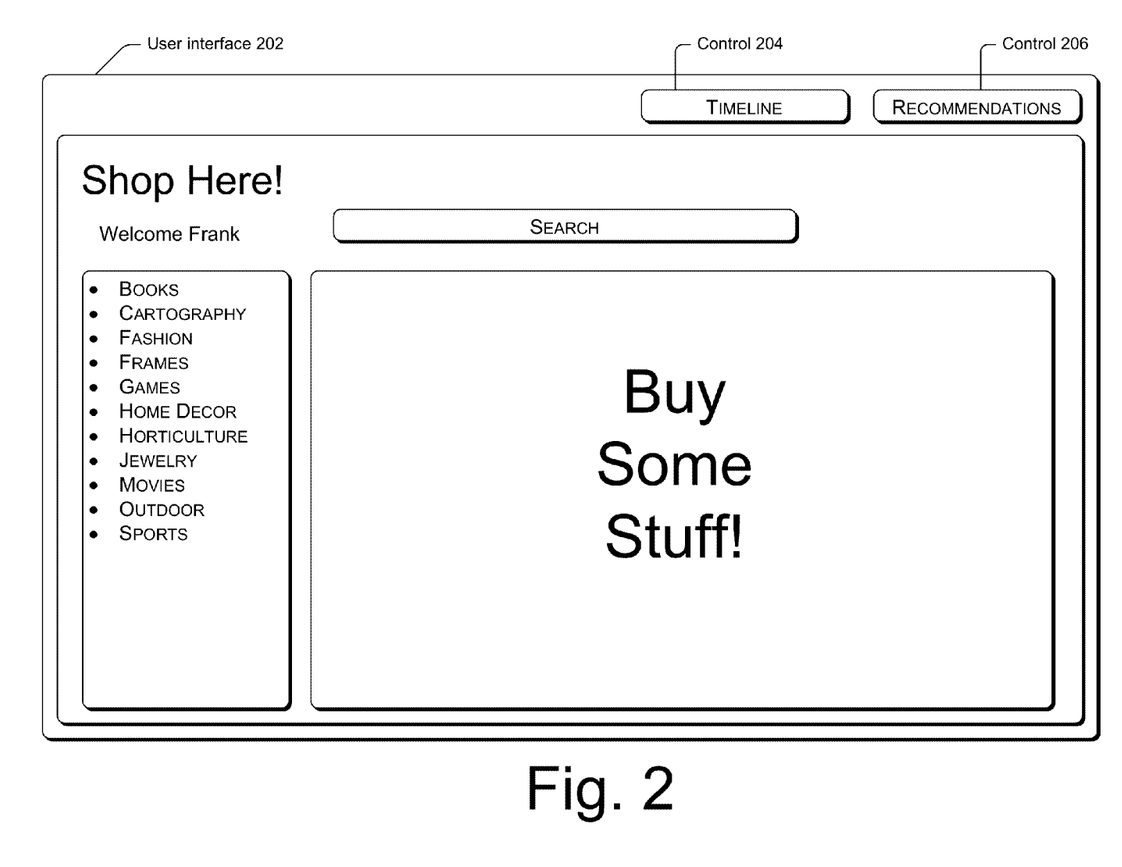
FIG. 2 illustrates an example graphic user interface generated by an electronic commerce service that enables a user to obtain a timeline user interface or a recommendation user interface.
Figure 6:
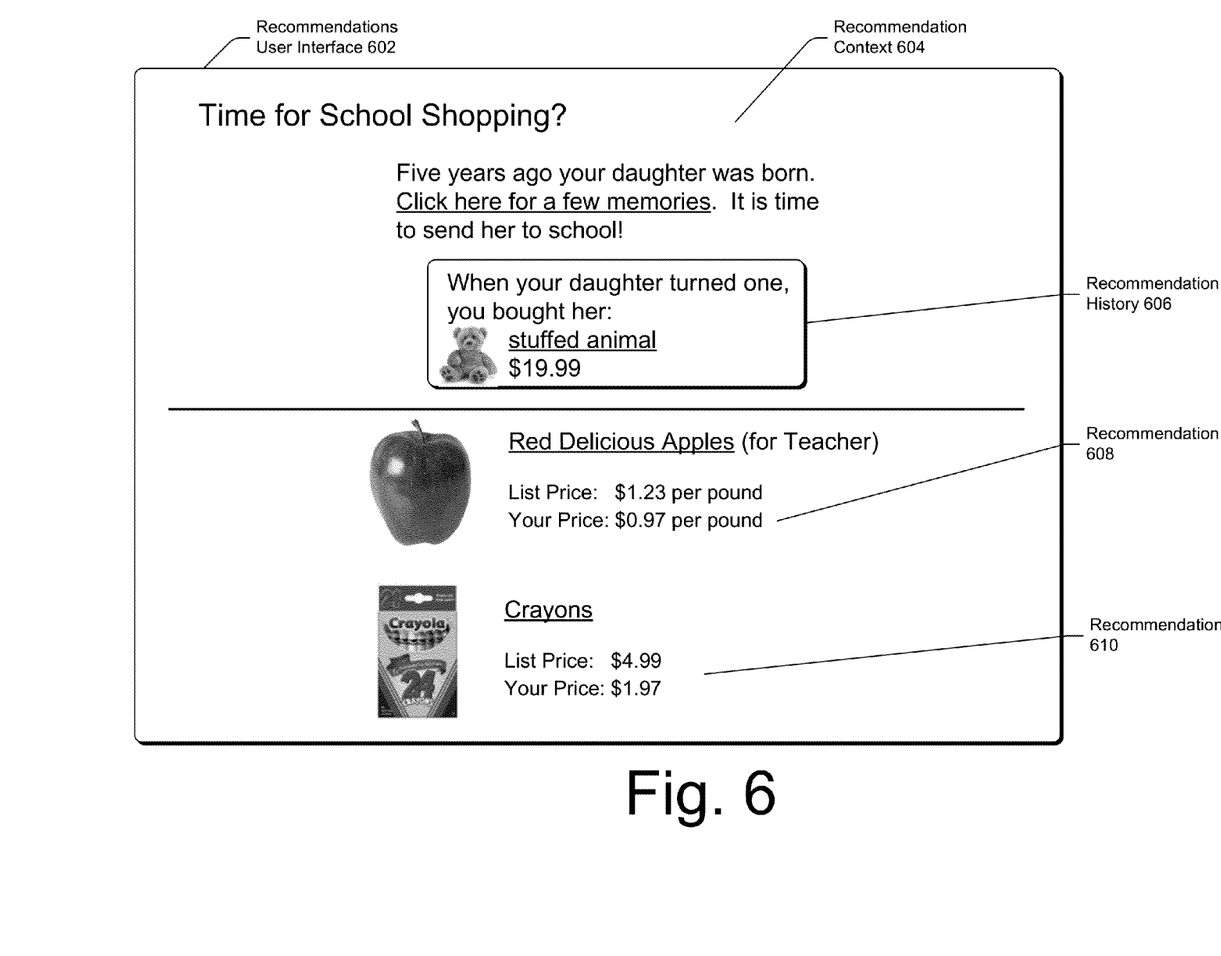
FIG. 6 illustrates an example graphic user interface generated by the electronic commerce service that conveys recommendations for items having a tendency to be purchased following an event and an indication of that event.

An example of such an interface is illustrated in FIG. 2. As shown in FIG. 2, an electronic commerce user interface 202 may be a landing page or home page of an electronic commerce web site and may include controls 204 and 206 displayed in some location within the user interface 202, such as a navigation or header portion of the user interface 202. The control 204 may be a button, graphic, or other sort of linking control that, when clicked, tapped, or otherwise actuated, causes a timeline associated with the user logged into the electronic commerce web site to be presented to the user (e.g., through a timeline user interface, such as the timeline user interface illustrated in FIG. 3). Similarly, the control 206 may be a button, graphic, or other sort of linking control that, when clicked, tapped, or otherwise actuated, causes a recommendation user interface (e.g., the recommendation user interface illustrated in FIG. 6) to be displayed to the user.

Returning to FIG. 1, the electronic commerce module 110 illustrated therein may also perform any other sort of function typically associated with an electronic commerce service 102. Such other sorts of functions are well known and will not be described further.

In various embodiments, the memory 108 further stores a timeline module 112. The timeline module 112 may be configured to generate a timeline structure for a user. The timeline module 112 may generate the timeline structure automatically, without any request from the user, or may do so in response to a user request, such as a user interaction with the control 204. To generate the timeline structure, the timeline module 112 first receives or retrieves user data, such as user data 114 and user behavior data 116. The user data 114 may include at least one of personal information, social networking activity, wish lists, user communications, pictures, or user behavior data, such as user behavior data 116. The user behavior data 116 may include a browsing history, a purchase history, product reviews associated with the user, collaborative shopping or browsing information, or user communications. The user data 114 may be received from any number of sources. For example, the social networking activity data may be received from a social networking module 118. That social networking module 118 may have received or retrieved the social networking activity data from a social networking service.

The user behavior data 116 may be generated and maintained by the electronic commerce module 110 or by related functionality. One type of user behavior data 116, collaborative shopping/browsing information, may be generated and provided by a collaborative shopping module 120. The collaborative shopping module 120 may provide users of the electronic commerce service 102 with a collaborative shopping experience, enabling users to jointly browse content in a collaborative shopping session, each user seeing what other users in the session are browsing. The collaborative shopping module 120 may further enable users participating in a collaborative shopping session to chat with each other during the session. This chat activity may be analyzed by a sentiment analysis module 122 associated with the collaborative shopping module 120 to produce sentiment analysis information associated with comments included in the collaborative shopping information. Examples of such a collaborative shopping module 120 and sentiment analysis module 122 are described in greater detail in U.S. patent application Ser. No. 13/645,383, filed on Oct. 4, 2012 and entitled "Collaborative Browsing and Chat Sessions," which is hereby incorporated by reference herein in its entirety.

In various embodiments, the timeline module 112 uses the received or retrieved user data 114 and user behavior data 116 to determine one or more significant events associated with the user. For user data 114 which includes social networking activity data, the timeline module 112 may determine events based on the level of activity associated with a social networking item (e.g., comments or indications of approval associated with a post); based on which social network items are listed as events in a social network timeline for the user; or based on personal information about the user maintained by the social network (e.g., birthday, wedding anniversary, etc.). For user behavior data 116 that includes collaborative shopping information associated with sentiment analysis, the timeline module 112 may determine events based on the sentiment analysis. Additionally, the timeline module 112 may determine events based on any of: wish list activity, semantic analysis of social network activity, of user communications; user reviews, demographic information, qualitative data associated with user behavior data 116; or date-based patterns found in the user data 114 or user behavior data 116. Significant events may be any sort of events occurring in the life of the user independently of the user data, such as birthdays, major purchases, etc. In some embodiments, significant events may even include predicted future events. For example, if one significant event is the birth of a child, the timeline module 112 may determine that the child starting school in five to six years is a predicted significant event that should be included in the timeline structure.

In some embodiments, the timeline module 112 then determines user data which is contextually relevant to the significant events. The user data may include user behavior data 116 that is contextually relevant to the determined events and may include other user data 114 that is contextually relevant. The contextual relevance of a part the user data to one of the significant events may be determined by the timeline module 112 based on proximity in time of the part of the user data to the significant event or based on semantic analysis of the part of the user data. With future events, the contextually relevant user behavior data 116 may correspond to predictions of user behavior, which are described in further detail herein.

In further implementations, the user data may include an indication of current activity of the user. The current activity may be either a significant event or may be user data that is contextually relevant to a significant event. If the current activity is a significant event, the timeline module 112 may determine user behavior data 116 that is contextually relevant to the current activity. If the current activity is contextually relevant to some other significant event, the timeline module 112 may determine user behavior data 116 that is also relevant to that significant event and may associate the that user behavior data 116 with the current activity. This association enables the electronic commerce service 102 to provide a user interface that presents both a current activity and user behavior data 116 that is contextually relevant to or with that current activity (see, e.g., the user interface illustrated by FIG. 5). In some embodiments, the user behavior data 116 has a temporal relationship to the current activity. For instance, the user may be browsing stereos, and the user behavior data 116 may indicate that the user purchased a stereo four years ago.

In various embodiments, the memory 108 further includes a presentation module 124 to present the timeline structure generated by the timeline module 112 to the user. The presentation module 124 may be invoked responsive to a user interaction with a graphic control, such as control 204, or may be invoked by the timeline module 112 following the generation of a timeline structure. The presentation module 124 may cause the timeline structure or a part of the timeline structure to be displayed to the user in any of a number of ways.

Figure 3:
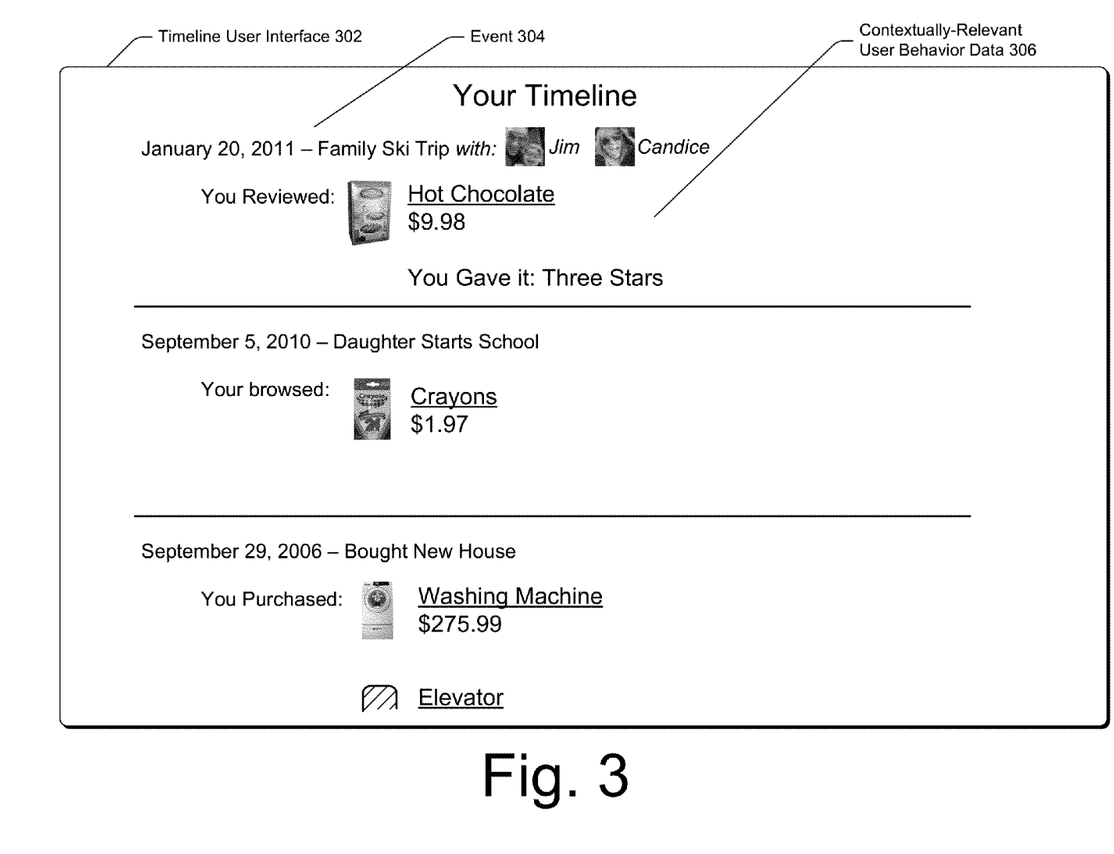
FIG. 3 illustrates an example graphic user interface generated by the electronic commerce service that conveys a timeline of a user, the timeline including events associated with the user and user behavior data that is contextually relevant to the events.

For example, the presentation module 124 may generate a graphic user interface for the electronic commerce service 102 to serve to the user through the web site of the electronic commerce service 102. For example, FIG. 3 illustrates a timeline user interface 302 served by the web site of the electronic commerce service 102. The timeline user interface 302 may include representations 304 of a plurality of significant events. With each representation 304, the timeline user interface 302 includes representations 306 of user behavior data 116 that is contextually relevant to the significant event associated with that representation 304. As shown in FIG. 3, a representation 304 of an event taken from a social networking service or from some other service maintaining a social context may include indications of persons associated with that event.

Figure 4:
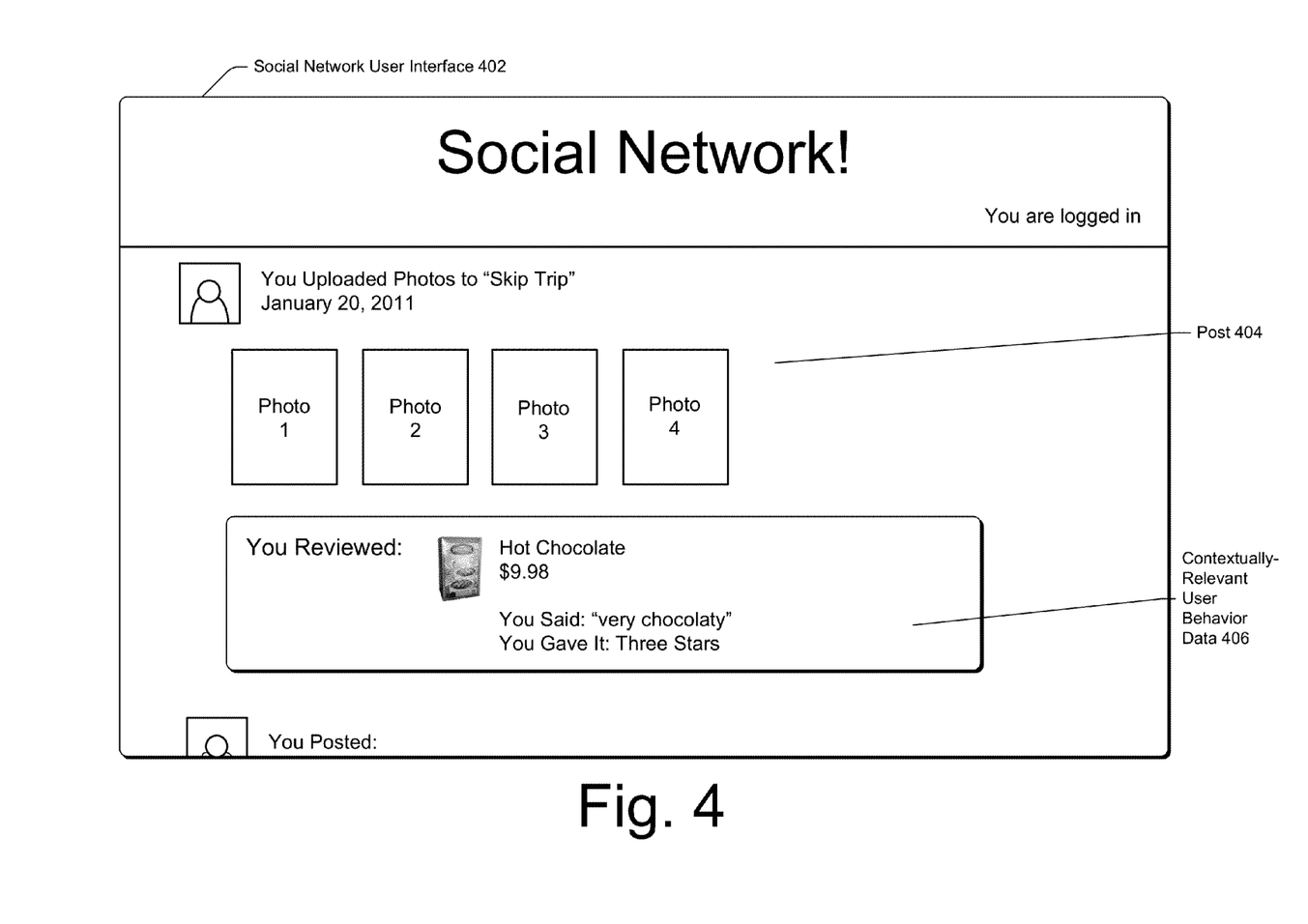
FIG. 4 illustrates an example graphic user interface of generated by a social networking service which includes, inline, parts of a timeline for a user that relate to events shown on the social network graphic user interface.

As another example, the presentation module 124 may interface with a social networking service to provide the timeline structure or parts of the timeline structure to the social networking service for display within a user interface of the social networking service. For example, FIG. 4 illustrates a social network user interface 402 provided by a web site of a social networking service. The social network user interface 402 includes a number of posts 404 associated with significant events. These posts 404 may correspond to significant events included in the timeline structure. The social network user interface 402 may also include, with at least some of the posts 404, representations 406 of user behavior data 116 that is contextually relevant to the significant events associated with those posts 404. Such user behavior data 116 may be retrieved from parts of the timeline structure that are provided to the social network service.

Figure 5:
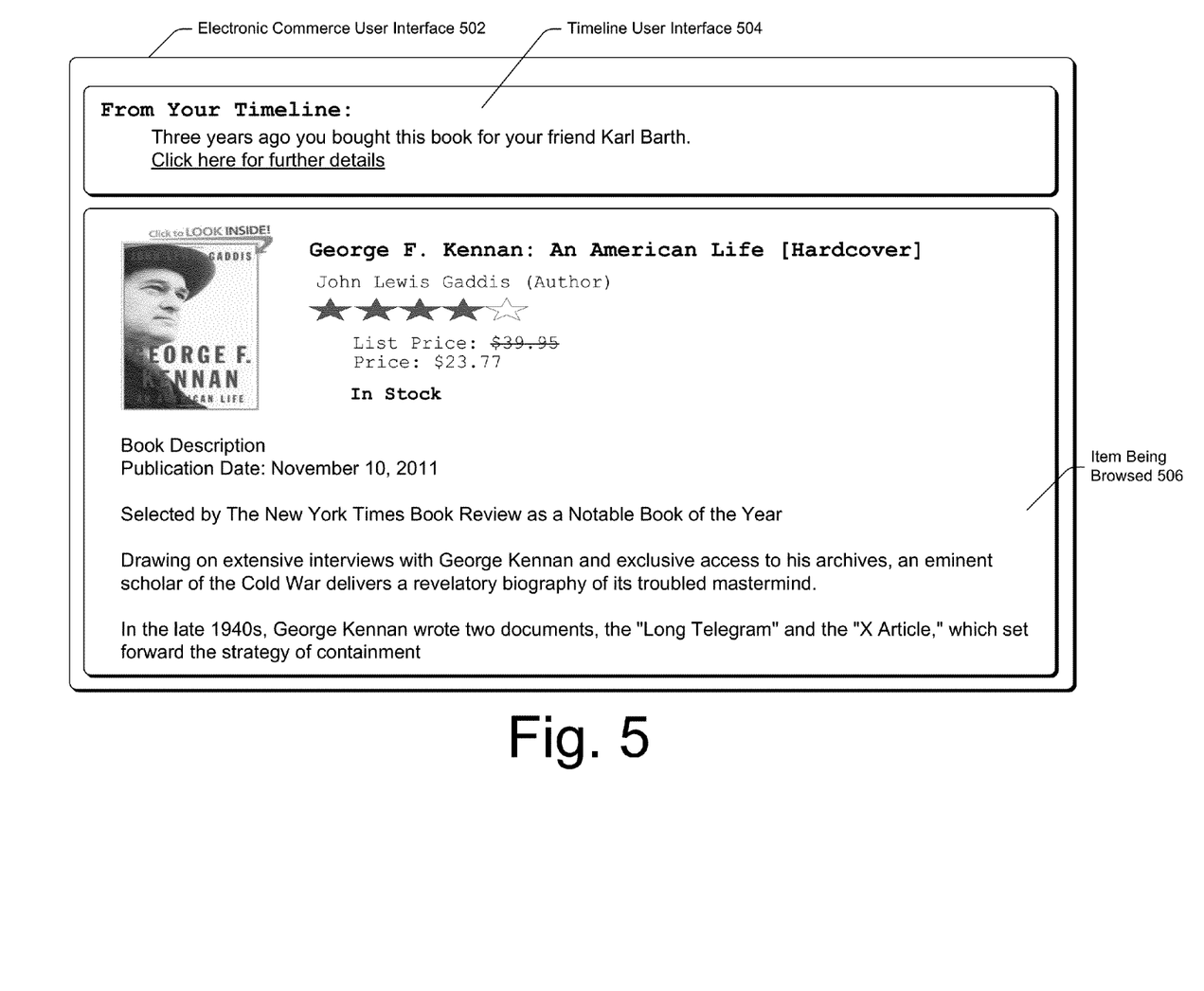
FIG. 5 illustrates an example graphic user interface generated by the electronic commerce service, the graphic user interface including one or more items browsed by a user and a part of a timeline associated with the user that is contextually related to the one or more items being browsed.

As yet another example, the presentation module 124 may receive an indication of a current activity of the user and may determine parts of the timeline structure associated with that current activity, including user behavior data 116 that is contextually relevant to the current activity or to an event, where both the user behavior data 116 and the current activity are contextually relevant to that event. The presentation module 124 may then present a representation of the user behavior data 116 in a user interface associated with the current activity of the user. For example, FIG. 5 shows an electronic commerce user interface 502 associated with user browsing of a book. The electronic commerce user interface 502 includes a representation 504 of a part of the timeline structure, the representation 504 displayed concurrently with a part 506 of the user interface 502 showing the item being browsed by the user. The representation 504 indicates that the book being browsed was previously purchased for a friend.

Returning to FIG. 1, the memory 108 may also include a prediction module 126. The prediction module 126 analyzes user data, such as user data 114 and user behavior data 116, and determines one or more predictions of user behavior based on the analysis. The user data 114 may include at least personal information, demographic information, social network data, or part of a user's timeline. Further, the user data 114 may be indicative of one or more significant events that are associated with user behavior which has a tendency to occur following the events. For example, the user data 114 may be indicative of the birth of a child, and that event may be associated with a purchase of school supplies several years in the future. In some embodiments, the user data 114 may also include answers to questions posed to the user for the purpose of determining predictions of user behavior.

The prediction module 126 may apply one or more sets of user behavior prediction criteria 128 to find a best match to the user data. The user behavior prediction criteria 128 may include one or more identifiers, patterns or models specifying data that is indicative of the events included in the user data. Each set of user behavior prediction criteria 128 may be associated with one or more predictions of user behavior, and the prediction module 126 may determine the predictions of user behavior for user data based on which set of user behavior prediction criteria 128 best matches or corresponds to the user data.

In various embodiments, the recommendation module 130 determines recommendations for items associated with the predictions of user behavior and provides those recommendations to the user. The recommendation module 130 may receive the predictions of user behavior from the prediction module 126 and may in some way determine item recommendations associated with the predictions. Such item recommendations may be determined based on mapping of recommendations to predictions, based on patterns or modeling, etc.

Upon determining item recommendations, the recommendation module 130 provides those item recommendations to the user. The recommendation module 130 may provide the recommendations through at least one of an email, real-time browsing, a text message, social networking post, microblog post, or a multi-media message. For example, the recommendation module 130 may cause a recommendation user interface, such as the recommendation user interface 602 illustrated by FIG. 6, to be provided to the user. The recommendation user interface 602 may be provided responsive to a user selecting control 206, and may be served as a web page of the web site of the electronic commerce service 102. The recommendation user interface 602 may include a recommendation context 604, recommendation history 606, and multiple recommendations, such as recommendations 608 and 610. The recommendation context 604 may convey the event to which both the predictions and their associated recommendations 608 and 610 are related (e.g., the birth of a child) as well as a reason or inference explaining the relation of the event to the recommendations. A recommendation history 606 may present user behavior data that is also associated with the recommendation context.

In some instances, the electronic commerce service 102 may have features or functionality in addition to those that FIG. 1 illustrates. For example, the electronic commerce service 102 may also include additional data storage devices (removable and/or non-removable, local or remote) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the electronic commerce service 102 may reside remotely from the electronic commerce service 102 in some implementations. In these implementations, the electronic commerce service 102 may utilize the network interfaces 106 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 7:
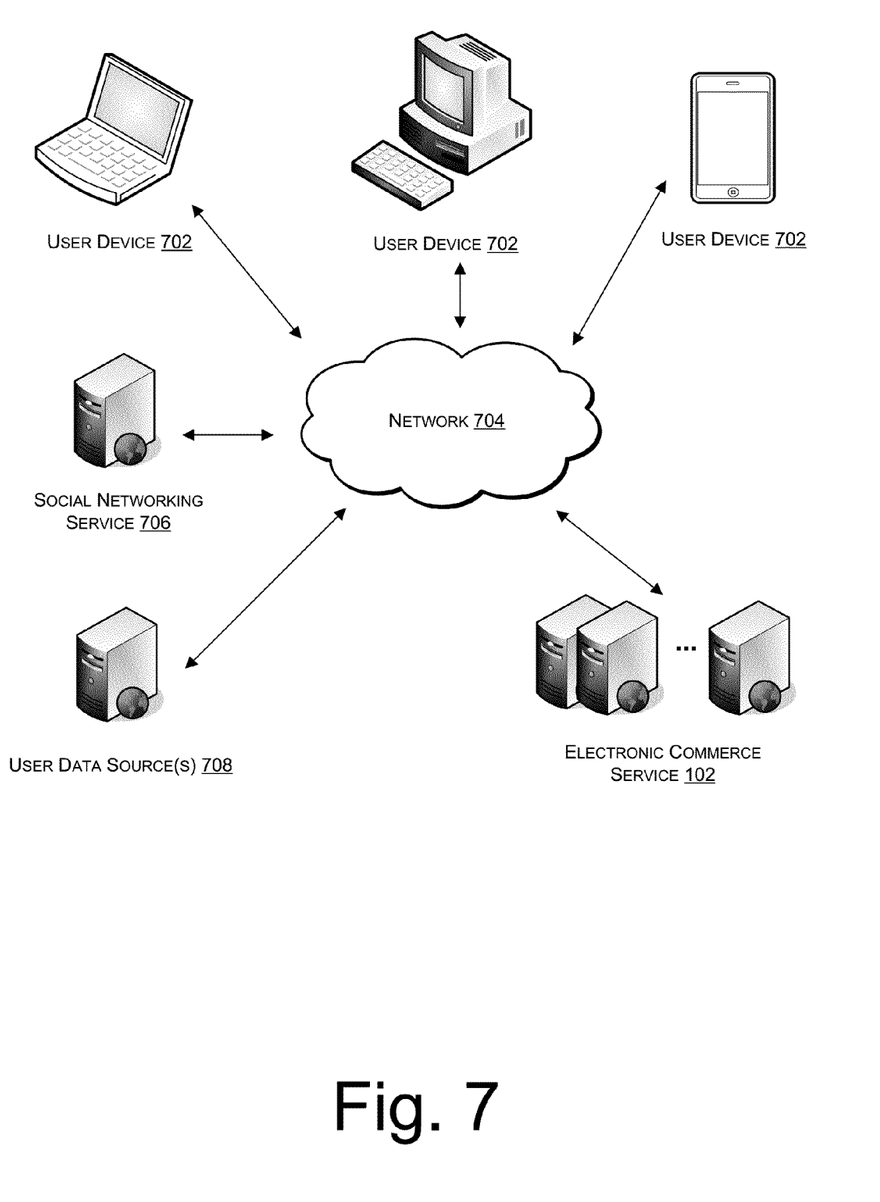
FIG. 7 illustrates an example network environment in which an electronic commerce service provides a timeline of events and associated user behaviors or recommendations of predicted user behaviors to users of a plurality of user devices.

FIG. 7 illustrates an example network environment in which an electronic commerce service 102 provides a timeline of events and associated user behaviors or predicted user behaviors to users of a plurality of user devices. As illustrated, electronic commerce service 102 communicates with a plurality of user devices 702 over a network 704 and provides a timeline or recommendation to users of the user devices 702. The electronic commerce service 102 may also communicate with a social networking service 706 (e.g., a social networking web site) to obtain a list of contacts for a user. Further, the electronic commerce service 102 may also communicate with one or more other user data sources 708. The electronic commerce service 102 is described above in detail with respect to FIG. 1.

In various embodiments, the social networking service 706 and the other data source(s) 708 may each be implemented on one or more computing devices, web services, or hosted computing environments. In addition, the user devices 707, social networking service 706, and the other data source(s) 708 may each be or include a computing device, such as a PC, a laptop computer, a server, a server farm(s), a mainframe, a tablet computer, a work station, a telecommunication device, a PDA, a media player, a media center device, a PVR, a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device.

In some embodiments, a single user may be associated with a plurality of user devices 702, logging in from any one user device or from multiple user devices. A single user device 702 may also be associated with multiple users, with each user having a separate browser/client window open and logged into the electronic commerce service 102 and/or the social networking service 706. Each user device 702 may have a browser or other client that is capable of connecting to one or more of the electronic commerce service 102 and/or the social networking service 706. Each user device 702 may further have a display and one or more input mechanisms to enable the users to interact with the user interfaces received from the electronic commerce service 102 and/or the social networking service 706.

In some implementations, the network 704 may be any sort of network or networks that connect the electronic commerce service 102, user devices 702, social networking service 706, and other data source(s) 708. Also, the network 704 may connect any of the electronic commerce service 102, user devices 702, social networking service 706, and other data source(s) 708 to other devices. The network 704 may be any type of network, such as a wide area network (WAN), a local area network (LAN), or the Internet. Also, the network 704 may be public, private, or include both public and private networks. Further, the network 704 may be wired, wireless, or include both wired and wireless networks. The network 704 may utilize any one or more protocols for communication, such as the Internet Protocol (IP), other packet based protocols, or other protocols. Additionally, the network 704 may include any number of intermediary devices, such as routers, base stations, access points, firewalls, or gateway devices.

In further embodiments, the social networking service 706 may be a dedicated social networking service (e.g., a social networking website) or another service that provides social networking features (e.g., a retail website with social networking features). The social networking service 706 may, for example, provide a timeline user interface (also referred to herein as a social network user interface) that presents user posts, user media, and other user content or information in a date-based fashion. An example of such a user interface is illustrated in FIG. 4 and is described in further detail above. The social networking service 706 may enable users to post content and interact with other users. The social networking service 706 may also provide an interface to the electronic commerce service 102, enabling the electronic commerce service 102 to retrieve user data, such as the information used to construct the social network user interface, as well as other data associated with the user. The interface may further enable the electronic commerce service 102 to submit parts of a timeline structure, such as pairs of events and user behavior data contextually related to those events, to the social networking service 706. The social network service 706 may then locate matching events in its timeline for the user and display the contextually relevant user behavior data in visual proximity to those events.

In some embodiments, user data source(s) 708 may be any sort of store or stores of user data. Such stores may include personal information, demographic information, wish lists, user communications, pictures, etc. They may be queried by the electronic commerce service 102 and may provide the user data in response to the queries.

Figure 8:
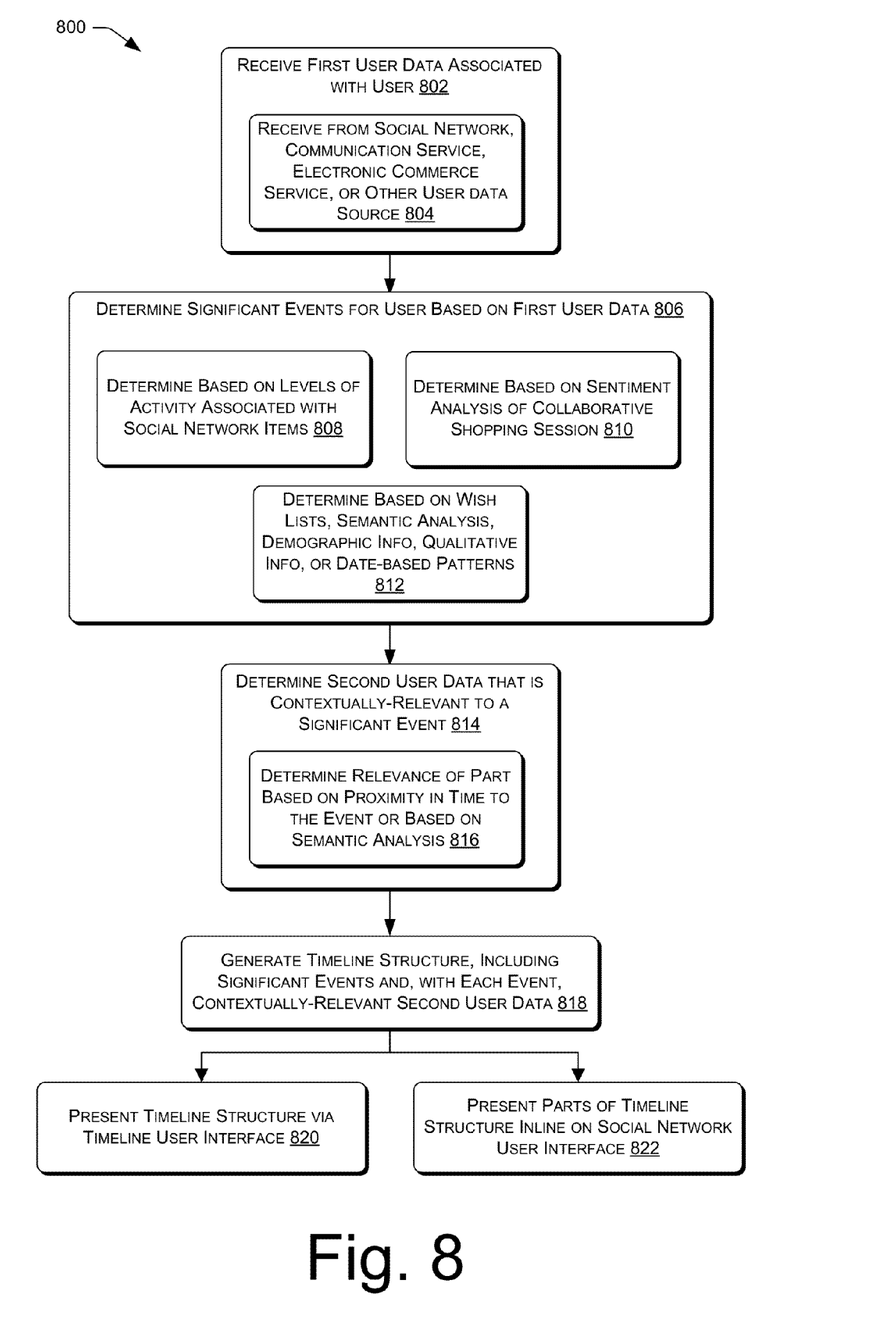
FIG. 8 illustrates an example process for generating a timeline of significant events associated with a user and of user behavior that is contextually relevant to the events.
Figure 9:
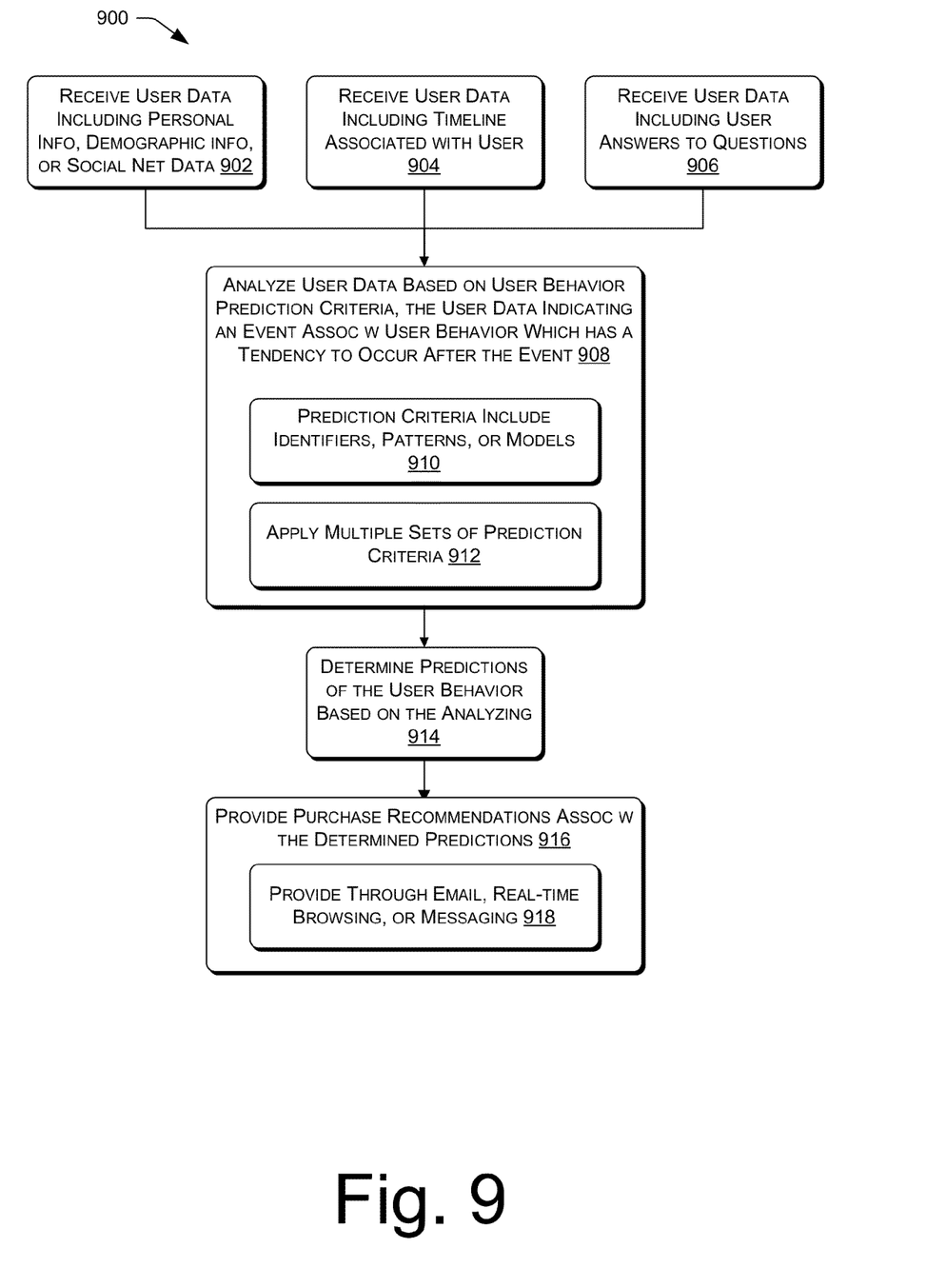
FIG. 9 illustrates an example process for predicting user behavior that has a tendency to occur after an event and for providing recommendations associated with the predictions.

FIGS. 8 and 9 illustrate example processes 800 and 900. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 8 illustrates an example process 800 for generating a timeline of significant events associated with a user and of user behavior that is contextually relevant to the events. At 802, the electronic commerce service 102 receives first user data associated with a user. At 804, the receiving includes receiving the first user data from a social networking service, a communication service, an electronic commerce service 102, or another user data source. The first user data may include at least one of personal information, social networking activity, wish lists, user communications, pictures, or user behavior data. User behavior data may, in turn, include a browsing history, a purchase history, product reviews associated with the user, collaborative shopping information, or user communications.

At 806, the electronic commerce service 102 determines one or more significant events based on the first user data. As indicated at 808, the first user data includes social networking data and the determining includes determining the one or more significant events based on levels of activity associated with social network items. As indicated at 810, the first user data includes user communications or collaborative shopping information and the determining includes determining the one or more significant events based on sentiment analysis of the user communications or shopping information. At 812, the determining includes determining the one or more significant events based on wish list activity, semantic analysis of social network activity, of user communications, or of user reviews, demographic information, qualitative data associated with user behavior data, or date-based patterns found in the first user data. The significant event may be an event occurring in the life of the user independently of the first data associated with the user or second data associated with the user.

At 814, the electronic commerce service 102 determines second data associated with the user that is contextually relevant to the one or more significant events, the second user data including user behavior data associated with the user. The first user data and second user data may differ by at least a category of information that is included in one of the first and second user data, but not in the other. At 816, the determining includes determining the contextual relevance based on proximity in time of the part of the second user data to the significant event or based on semantic analysis of the part of the second user data. In some embodiments, the one or more significant events include predicted future events, and the contextually relevant second user data includes predicted user behavior that is contextually relevant to the predicted events. In further embodiments, the significant event is a contemporaneous action of the user and the contextually relevant second user data has a temporal relationship to the significant event.

At 818, the electronic commerce service 102 generates a timeline structure for the user, the timeline structure including the one or more significant events and, with each significant event, the second user data determined to be contextually relevant to that significant event.

At 820, the electronic commerce service 102 presents the timeline structure to the user via a timeline user interface, such as one of the timeline user interfaces illustrated in FIGS. 3 and 5. Alternatively, at 822, the electronic commerce service 102 presents parts of the timeline structure on a social network user interface, such as the social network user interface illustrated in FIG. 4, inline with events shown on the social network user interface.

FIG. 9 illustrates an example process 900 for predicting user behavior that has a tendency to occur after an event and for providing item recommendations associated with the predictions. The process 900 includes, at 902-906, receiving user data. At 902, the electronic commerce service 102 receives user data that includes personal information, demographic information, and/or social network data. At 904, the electronic commerce service 102 receives user data including significant events that are included in a timeline structure associated with the user. At 906, the electronic commerce service 102 receives user data which includes answers to a series of questions posed to the user.

At 908, the electronic commerce service 102 analyzes the user data based on user behavior prediction criteria. The user data received at 902-906 may indicate an event associated with user behavior which has a tendency to occur following the event. At 910, the electronic commerce service 102 applies prediction criteria that include identifiers, patterns or models. At 912, these prediction criteria may be one set among multiple sets of user behavior prediction criteria, each of which may be applied to the user data to determine a best fit to the event(s) indicated by the user data. Each set of user behavior prediction criteria may be associated with one or more predictions of user behavior.

At 914, the electronic commerce service 102 determines one or more predictions of user behavior based on the analysis. In some embodiments, the determining may include determining which set of user behavior prediction criteria best fit the event(s) indicated by the user data and retrieving the predictions associated with those criteria.

At 916, the electronic commerce service 102 provides to the user associated with the user data one or more item recommendations associated with the predictions of user behavior. At 918, the providing may include providing the one or more item recommendations through at least one of an email, real-time browsing, a text message, social networking post, microblog post, or a multi-media message.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors, thus transforming the general purpose computers or processors into specifically configured devices. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A system comprising:
    a data store configured to store one or more modules for execution; and
    a hardware processor in communication with the data store, the processor configured to execute modules stored in the data store comprising:
        a timeline module including computer executable instructions, that when executed, cause the processor to:
            determine, based at least in part on first data associated with a user, one or more significant life events of the user, wherein the one or more significant life events include at least one of birthdays, vacations, changing residences, birth of a child, educational milestones, or anniversaries;
            determine second data associated with the user that is contextually relevant to the one or more significant life events; and
            generate a timeline structure for the user, the timeline structure including the one or more significant life events and the second data determined to be contextually relevant to the one or more significant life events;
        a prediction module including computer executable instructions, that when executed, cause the processor to determine a prediction of user behavior based at least in part on an analysis of the timeline structure with respect to a user behavior prediction criterion, the user behavior having a tendency to follow an occurrence of at least one of the one or more significant life events; and
        a recommendation module including computer executable instructions, that when executed, cause the processor to provide an item recommendation associated with the prediction of user behavior to the user.

2. The system of claim 1, further comprising a presentation module configured to generate a user interface including the timeline structure.

3. The system of claim 1, further comprising a social networking module configured to retrieve at least a part of the first data from a social network and to generate a user interface including parts of the timeline structure together with events identified by the social networking service.

4. The system of claim 1, further comprising:
a collaborative browsing module configured to enable the user and one or more other users to browse items together and to engage in chat activity while browsing, and
a sentiment analysis module configured to determine a sentiment associated with the chat activity, the sentiment being used to determine the one or more significant life events.

5. The system of claim 1, wherein the part of the second data that is contextually relevant to the one or more significant life events is determined based at least in part on at least one of a proximity in time of the part of the second data to the one or more significant life events, or semantic analysis of the part of the second data.

6. A computer-implemented method comprising:
under control of one or more computing devices configured with specific computer executable instructions,
receiving first data associated with a user;
determining, based at least in part on the first data, one or more significant life events of the user;
determining second data associated with the user that is contextually relevant to the one or more significant life events, the second data including user behavior data associated with the user;
generating a timeline structure for the user, the timeline structure including the one or more significant life events and including the second data determined to be contextually relevant to the one or more significant life events;
predicting user behavior based at least in part on an analysis of the timeline structure with respect to at least one a user behavior prediction criterion, the user behavior having a tendency to follow an occurrence of at least one of the one or more significant life events; and
providing, to a user device associated with the user, an item recommendation associated with the prediction of user behavior.

7. The computer-implemented method of claim 6, wherein the first data includes at least one of personal information, social networking activity, wish list data, user communications, images, or user behavior data.

8. The computer-implemented method of claim 7, wherein the user behavior data includes at least one of a browsing history, a purchase history, product reviews associated with the user, collaborative browsing information, or user communications.

9. The computer-implemented method of claim 6, wherein the first data and second data differ by at least a category of information that is included in one of the first data and second data.

10. The computer-implemented method of claim 6, wherein at least a part of the first data is received from at least one of a social networking service or a communication service.

11. The computer-implemented method of claim 6, wherein the first data includes social network items, and the determining comprises determining the one or more significant life events based at least in part on levels of activity associated with the social network items.

12. The computer-implemented method of claim 6, wherein the first data includes at least one of user communications or collaborative browsing information, and the determining comprises determining the one or more significant life events based at least in part on sentiment analysis of the at least one of user communications or collaborative browsing information.

13. The computer-implemented method of claim 6, wherein the determining comprises determining the one or more significant life events based at least in part on at least one of wish list activity; semantic analysis of at least one of social network activity, user communications, or user reviews; demographic information; qualitative data associated with user behavior data; or date-based patterns found in the first data.

14. The computer-implemented method of claim 6, wherein an individual one of the one or more significant life events is a contemporaneous action of the user, and the contextually relevant second data has a temporal relationship to the individual one of the one or more significant life events.

15. The computer-implemented method of claim 6, wherein a part of the second data is contextually relevant to a first significant life event, and wherein the part of the of second data that is contextually relevant to the first significant life event is determined based at least in part on at least one of proximity in time of the part of the second data to the first significant life event, or semantic analysis of the part of the second data.

16. The computer-implemented method of claim 6, further comprising causing presentation of a user interface including the timeline structure.

17. The computer-implemented method of claim 6, further comprising causing presentation of a user interface by a social networking service, wherein the user interface includes parts of the timeline structure together with events identified by the social networking service.

18. The computer-implemented method of claim 6, wherein the one or more significant life events include a predicted future event, and the second data comprises predicted user behavior that is contextually relevant to the predicted event.

19. A non-transitory computer-readable medium storing computer executable instructions that, when operated by a processor, perform operations comprising: analyzing user data associated with a user based at least in part on a user behavior prediction criteria, the user data including at least one of personal information, demographic data, or social network data and indicating a significant life event associated with user behavior; determining additional data associated with the user that is contextually relevant to the significant life event; generating a timeline structure including the significant life event and the additional data; determining a prediction of the user behavior for the user based at least in part on the analyzing the user data and the generating the timeline structure; and providing to the user an item recommendation associated with the prediction of the user behavior.

20. The non-transitory computer-readable medium of claim 19, wherein the event is associated with user behavior which has a tendency to occur following the significant life event.

21. The non-transitory computer-readable medium of claim 19, wherein the user behavior prediction criteria comprises at least one of an identifier, pattern or model specifying data that is indicative of the significant life event.

22. The non-transitory computer-readable medium of claim 19, wherein the user behavior prediction criteria comprises at least one of multiple sets of user behavior prediction criteria, each set of user behavior prediction criteria associated with a prediction of user behavior.

23. The non-transitory computer-readable medium of claim 19, wherein the user data comprises significant life events that are included in a timeline structure associated with the user.

24. The non-transitory computer-readable medium of claim 19, wherein the user data includes an answer to a question posed to the user.

25. The non-transitory computer-readable medium of claim 19, wherein the providing to the user an item recommendation comprises providing the item recommendation through at least one of an email, real-time browsing, a text message, a social network message, a microblog message, or a multi media message.

\* \* \* \* \*